(12) United States Patent
Hashimoto

(10) Patent No.: US 11,633,893 B2
(45) Date of Patent: Apr. 25, 2023

(54) FINE PATTERN TRANSFER MOLD AND FINE PATTERN MOLDING METHOD

(71) Applicant: SANKO KASEI CO., LTD., Tokyo (JP)

(72) Inventor: Hisashi Hashimoto, Ichinoseki (JP)

(73) Assignee: SANKO KASEI CO., LTD., Tokyo (JP)

( * ) Notice: Subject to any disclaimer, the term of this patent is extended or adjusted under 35 U.S.C. 154(b) by 0 days.

(21) Appl. No.: 16/624,393

(22) PCT Filed: Jun. 17, 2019

(86) PCT No.: PCT/JP2019/023900
§ 371 (c)(1),
(2) Date: Dec. 19, 2019

(87) PCT Pub. No.: WO2020/217547
PCT Pub. Date: Oct. 29, 2020

(65) Prior Publication Data
US 2022/0032518 A1    Feb. 3, 2022

(30) Foreign Application Priority Data
Apr. 26, 2019 (JP) .............................. JP2019-085746

(51) Int. Cl.
*B29C 45/26* (2006.01)
*B29C 45/27* (2006.01)

(52) U.S. Cl.
CPC ...... *B29C 45/2642* (2013.01); *B29C 45/2703* (2013.01); *B29C 45/2737* (2013.01)

(58) Field of Classification Search
CPC ............ B29C 45/2642; B29C 45/2703; B29C 45/2737; B29C 45/30; B29C 45/32;
(Continued)

(56) References Cited

U.S. PATENT DOCUMENTS 6,224,364 B1 *   5/2001   Harvey ............... B29C 45/1615
                                                           264/328.7
6,899,838 B2     5/2005   Lastovich
(Continued)

FOREIGN PATENT DOCUMENTS

CN          101072668 A      11/2007
DE    10 2004 020 363 A1     11/2005
(Continued)

OTHER PUBLICATIONS

Tokyo University; "Increase detection sensitivity of biomarkers for diseases and infections by 1,000,000 times", Japan Science and Technology Agency, Aug. 31, 2012, 12 pages.
(Continued)

*Primary Examiner* — S. Behrooz Ghorishi
(74) *Attorney, Agent, or Firm* — Ohlandt, Greeley and Perle, LLP

(57) ABSTRACT

A purpose of the present disclosure is to provide a fine pattern transfer mold and a fine pattern molding method that allow high-resolution transfer of a fine pattern to the interior of a hollow product by integral molding.
In a product formation chamber that is formed between a cavity and a core pin member having a predetermined portion at which a fine pattern original plate is fixed by closing of a mold body, a gate into which a molten resin material flows from a hot runner member has an opening that is located outside an end of a fixed surface of the fine pattern original plate in a horizontal direction of the fixed surface and that faces the end of the fixed surface, an injection nozzle of the hot runner member and the gate are directly coupled together, and the hollow product is integrally molded by the resin material flowing from the gate.

9 Claims, 11 Drawing Sheets

(58) Field of Classification Search
CPC ............. B29C 2045/205; B29C 45/20; B29C 45/7331; B29C 37/0053; B29C 45/73; B29C 45/263
See application file for complete search history.

(56) References Cited

U.S. PATENT DOCUMENTS

| | | | |
|---|---|---|---|
| 7,052,268 B2 | 5/2006 | Powell et al. | |
| 2003/0147990 A1* | 8/2003 | Matsuura | B29C 45/263 425/406 |
| 2005/0260349 A1* | 11/2005 | Pawlowski | G02B 5/1852 427/282 |
| 2011/0163479 A1 | 7/2011 | Ferguson et al. | |
| 2012/0280428 A1* | 11/2012 | Ferguson | B29C 45/568 264/328.1 |
| 2019/0084202 A1* | 3/2019 | Bazzo | B29C 45/231 |

FOREIGN PATENT DOCUMENTS

| | | |
|---|---|---|
| DE | 10 2018 122 982 A1 | 3/2019 |
| JP | 2002-292701 A | 10/2002 |
| JP | 2006-297639 A | 11/2006 |
| JP | 2013-86388 A | 5/2013 |
| WO | 2018/213914 A1 | 11/2018 |

OTHER PUBLICATIONS

Chinese First Notice of Reasons for Refusal dated Nov. 29, 2021 from corresponding Chinese Patent Application No. 2019800003204.1, 18 pages.
German Office Action dated Apr. 16, 2021 from corresponding German Patent Application No. 1120190000075.6, 9 pages.

* cited by examiner (A)

(B)

(C)

(A)

(B)

(A)

(B)

(A)

(B)

(C)

(D)

(E)

(F)

(A)

(B)

FINE PATTERN TRANSFER MOLD AND FINE PATTERN MOLDING METHOD

TECHNICAL FIELD

The disclosure herein relates to a fine pattern transfer mold and a fine pattern molding method, and, in particular, to a technique for transferring a fine pattern to the inner surface of a hollow product.

BACKGROUND ART

As this kind of technique, imprint techniques are known. These imprint techniques make it possible to transfer, to a predetermined material, a fine concave-convex pattern of the order of several μm to several hundred μm that can be expected to be used in various fields such as semiconductor materials, optical materials, micromachinery, and bioengineering.

Examples of metal molds (stampers) for production of optical disc substrates include those that transfer a fine transfer pattern (bits or the like) using nickel electroformed parts or the like (see, for example, PTL 1), and those in a roll having two or more pattern parts arranged parallel to each other along the outer periphery of the roll, with the pattern parts each having a microstructure on the outer periphery of the mold and the microstructure of each pattern part having a size of 1 μm or less (see, for example, PTL 2).

Further, the fine pattern may need to be formed inside a hollow product (for example, a bottomed cylindrical product) to allow molecules of the order of μm present in a liquid to be caught in concavities of the fine pattern (see, for example, NPTL 1).

For injection molding of a bottomed cylindrical product, that is, a hollow resin product, there is proposed a hollow product injection molding die that includes a hot runner communicating with a cavity and a pin that is slidably provided in the hot runner to open and close a gate, and that has a gas flow path in the pin for pressure-feeding a gas into the cavity (see, for example, PTL 3). For a hollow resin product, a product molding part has a longer flow path than for a flat plate and includes some bend portions, which may lead to the temperature of the resin decreasing during molding. Thus, the hot runner is used to prevent a molding failure due to the temperature drop.

CITATION LIST

Patent Literatures

[PTL 1] JP 2006-297639 A
[PTL 2] JP 2013-086388 A
[PTL 3] JP 2002-292701 A

Non-Patent Literature

[NPTL 1] Japan Science and Technology Agency. "Millionfold improvement of the detection limit of biomarkers for diseases and infections," press release, joint statement, Aug. 31, 2012, [online] Available at: https://www.jst.go.jp/pr/announce/20120831/index.html [Accessed Mar. 25, 2019].

SUMMARY OF THE INVENTION

Technical Problem

For example, as a possible method for applying a fine pattern to the inner bottom surface of the hollow bottomed cylindrical product, using the techniques described in PTL 1 and PTL 2, a container bottom (that is, a flat plate) is separately produced, a flat surface of the bottom is processed to have the fine pattern, and a separately molded side part is joined to the bottom.

This method, however, doubles the number of parts and requires an additional step of joining together the side part and the bottom. In particular, when the bottomed cylindrical product is disposable and intended for large-scale use, it is necessary to avoid increase in effort and the number of parts from the viewpoints of manufacturing costs and working efficiency. In addition, joining two parts inevitably leads to the problem of a failure being highly likely to occur in the joined area, such as in the case of a poor joint. For use in biochemical analysis, in particular, such a joint failure may pose an obstacle to high-accuracy analysis due to the potential problem in reliability.

Thus, from the viewpoints of decreasing manufacturing cost, improving working efficiency, and enhancing reliability, a three-dimensional hollow product needs to be produced by integral molding to apply a fine pattern to its inner side as described in PTL 3. However, the hollow product injection molding die described in PTL 3 is aimed at production of relatively thick molded articles such as steering column covers, and thus is considered unsuitable for products with a fine pattern therein as described above.

Specifically, as described above, in the case of forming a fine pattern of a size of μm order in both radial and depth directions, the flow of a resin material becomes turbulent and complex and the length of the flow becomes longer than in the case of manufacturing a flat product, which causes a problem of difficulty in charging the resin material. In addition, according to the structure as described above, even when the resin material reaches the vicinity of the fine pattern, the resin material undergoes a large temperature drop that may cause transfer failure and molding failure.

Further, to manufacture a high-reliability product that can withstand the above-mentioned analysis or the like, the thickness of the entire hollow product needs to be reduced. In this case, the resin material quickly solidifies due to the temperature drop, and pressure loss makes it hard to transfer pressure to the resin material, which may lead to a transfer failure.

To solve the foregoing issues, an object of the present disclosure is to provide a fine pattern transfer mold and a fine pattern molding method that allow high-precision transfer of a fine pattern to the interior of a hollow product by integral molding.

Solution to Problem

To attain the foregoing object, a fine pattern transfer mold according to the present disclosure is mainly characterized in that, in a product formation chamber that is formed by a cavity and a core pin having a predetermined portion at which a fine pattern original plate is mounted by closing of a mold body, a gate into which a molten resin material flows from a hot runner member has an opening that is located outside an end of a transfer surface of the fine pattern original plate in a horizontal direction of the fixed surface and that faces the end of the fixed surface, an injection nozzle of the hot runner member and the gate are directly coupled together, and the hollow product is integrally molded by the resin material flowing from the gate.

According to this configuration, the molten resin material is first injected from the injection nozzle of the hot runner member toward a transfer surface for transferring the fine pattern. Accordingly, the resin material is supplied to the transfer surface at a temperature required for formation of a desired fine pattern. To supply the resin material to the transfer surface of the fine pattern first, it is generally necessary to provide the gate on the side facing the transfer surface to inject the resin material in a direction orthogonal to the transfer surface, that is, from above the transfer surface. However, with the gate provided on the side facing the transfer surface, a gate mark will be left on the product. The fine pattern of the transfer target surface of the molded product is to be observed, analyzed, and the like. Accordingly, the formation of a gate mark on the transfer surface should be avoided. For high-resolution transfer, temperature drop of the resin material to be supplied to the transfer surface should also be avoided, and thus, the gate has an opening that is located outside the end of the transfer surface of the fine pattern original plate in the horizontal direction of the transfer surface and that faces the end of the transfer surface.

That is, the fine pattern transfer mold according to the present disclosure is a fine pattern transfer mold that transfers a fine pattern to an inner surface of a hollow product by injection molding. The fine pattern transfer mold includes: a mold body including a fixed body and a movable body separable from each other, the fixed body having a coupling surface coupled to the movable body, the movable body having a coupling surface facing the coupling surface of the fixed body; a cavity formed in a concave shape on the coupling surface of the fixed body; a core pin member projecting from the coupling surface of the movable body so as to face the cavity, the core pin member having a predetermined portion at which a fine pattern original plate for transfer of the fine pattern is mounted; a product formation chamber that is formed between the cavity and the core pin member with the fixed body and the movable body clamped together; a gate having an opening that is located in the product formation chamber and outside an end of a transfer surface of the fine pattern original plate in a horizontal direction of the transfer surface and which faces the end of the transfer surface; and a hot runner member that has formed a flow path for a predetermined resin material in the fixed body and includes an injection nozzle directly coupled to the gate, the hot runner member being configured to: externally heat the flow path; and guide the resin material to the injection nozzle while maintaining, through the heated flow path, the resin material in a molten state at a predetermined temperature, wherein the molten resin material is injected from the injection nozzle via the gate in a direction toward the transfer surface to integrally mold the hollow product in the product formation chamber.

When the hollow product has a bottom and an inner bottom surface thereof is a transfer target surface to which the fine pattern is to be transferred, the fine pattern original plate may be fixedly mounted on the top surface of the core pin member.

The core pin member may include a temperature control member that prevents the predetermined portion, at which the fine pattern original plate is mounted, from having a temperature less than a predetermined temperature.

This configuration further reduces the incidence of a transfer failure of the fine pattern due to a temperature drop, thus enabling the formation of a reliable and high-resolution fine pattern. In particular, with the gate having an opening that is located outside the end of the transfer surface in the horizontal direction of the transfer surface and which faces the end of the transfer surface, there will occur a time lag in the arrival of the resin material from the end to the opposed end of the transfer surface, which may cause unevenness in transfer accuracy due to a difference in temperature of the resin material at the end and the opposed end. The temperature control member can be provided to make the temperature of the transfer surface uniform.

The core pin member and the fine pattern original plate mounted at an end portion of the core pin member constitute a stacked structure. The stacked structure has an outer side surface including a first outer side surface with which the resin material injected in the horizontal direction of the transfer surface comes into contact, and a second outer side surface of the end portion, the first outer side surface being on the second outer side surface. The outer side surface of the stacked structure may have a chamfered surface tapered toward the transfer surface of the fine pattern original plate.

This configuration allows the resin material flowing in from the gate to be smoothly guided by the chamfered part in the horizontal direction of the transfer surface, thereby shortening the time lag.

A fine pattern molding method according to the present disclosure is a fine pattern molding method for transferring a fine pattern to an inner bottom surface of a bottomed hollow product by injection molding. The fine pattern molding method includes the steps of: preparing a mold body that includes a fixed body having a cavity formed in a concave shape and a movable body having a convex core pin member with a fine pattern original plate fixedly mounted on a top surface of the core pin member; clamping the fixed body and the movable body to form a product formation chamber between the cavity and the core pin member; guiding, by a hot runner member, a predetermined resin material maintained in a molten state; arranging a gate having an opening that is located in the product formation chamber and outside an end of the transfer surface of the fine pattern original plate in the horizontal direction of the transfer surface and which faces the end of the transfer surface; supplying the resin material maintained in the molten state in the horizontal direction of the transfer surface to thereby supply the resin material into the product formation chamber; cooling the supplied resin material; opening the mold body by separating the movable body from the fixed body; ejecting a product molded in a shape of the product formation chamber using the core pin member, and maintaining the core pin member at a predetermined temperature until supply of the resin material to the product formation chamber by the injection is completed.

Advantageous Effects of the Invention

The fine pattern transfer mold and the fine pattern molding method according to the present disclosure enable high-efficiency and low-cost production of a hollow product having a high-resolution fine pattern transferred to its interior.

BRIEF DESCRIPTION OF THE DRAWINGS

FIG. 1(A) is a longitudinal sectional view of the fine pattern transfer mold in a closed state; and FIG. 1(B) is a longitudinal sectional view of the fine pattern transfer mold in an open state.

FIG. 4(A) is a longitudinal sectional view of the entire fine pattern transfer mold; FIG. 4(B) is an enlarged partial longitudinal sectional view of a leading end of the core pin member; and FIG. 4(C) is an enlarged partial longitudinal sectional view of a lower end of the core pin member.

FIG. 5(A) is a diagram illustrating the flow of a resin material in the case where a fine pattern original plate is welded to the leading end of the core pin member and then only bead removal is performed; and FIG. 5(B) is a diagram illustrating the flow of a resin material in the case where a fine pattern original plate is welded to the leading end of the core pin member, bead removal is performed, and the leading end of the core pin member is cut at a predetermined angle to form a chamfered part.

FIG. 6(A) is a schematic view of the injection nozzle and the gate as seen in a direction opposite to the direction in which an opening of the gate faces; and FIG. 6(B) is a schematic longitudinal sectional view of the injection nozzle and the gate.

FIG. 11(A) is a diagram illustrating the open state of the mold before supply of the resin material; FIG. 11(B) is a diagram illustrating the closed state of the mold; FIG. 11(C) is a diagram illustrating the resin material being injected from the injection nozzle of the hot runner member; FIG. 11(D) is a diagram illustrating the resin material being compressed with the mold closed; FIG. 11(E) is a diagram illustrating the mold in the open state after injection of the resin material is completed; and FIG. 11(F) is a diagram illustrating an integrally molded hollow product having been ejected after the fine pattern is transferred thereto.

FIG. 12(A) is a photograph of the fine pattern formed surface in the case where the temperature of the core pin member is maintained at 80° C.; and FIG. 12(B) is an enlarged microscope photograph of the fine pattern formed surface in the case where the temperature of the core pin member is maintained at 90° C.

DESCRIPTION OF EMBODIMENTS

Embodiments of the present disclosure will now be described with reference to the drawings. When an embodiment has components corresponding to those of another embodiment described earlier, the components will be given identical reference signs and duplicated description thereof will be omitted. When only some of the components are described in an embodiment, the other components may be given the reference signs used in embodiment(s) described earlier. Even if a combination of embodiments is not specified, respective embodiments may be partially combined unless there is a particular problem with the combination. Further, the embodiments described below are merely examples and are not intended to limit the present disclosure. Various changes may be made to the embodiments without deviating from the scope of the present disclosure.

Figure 1:
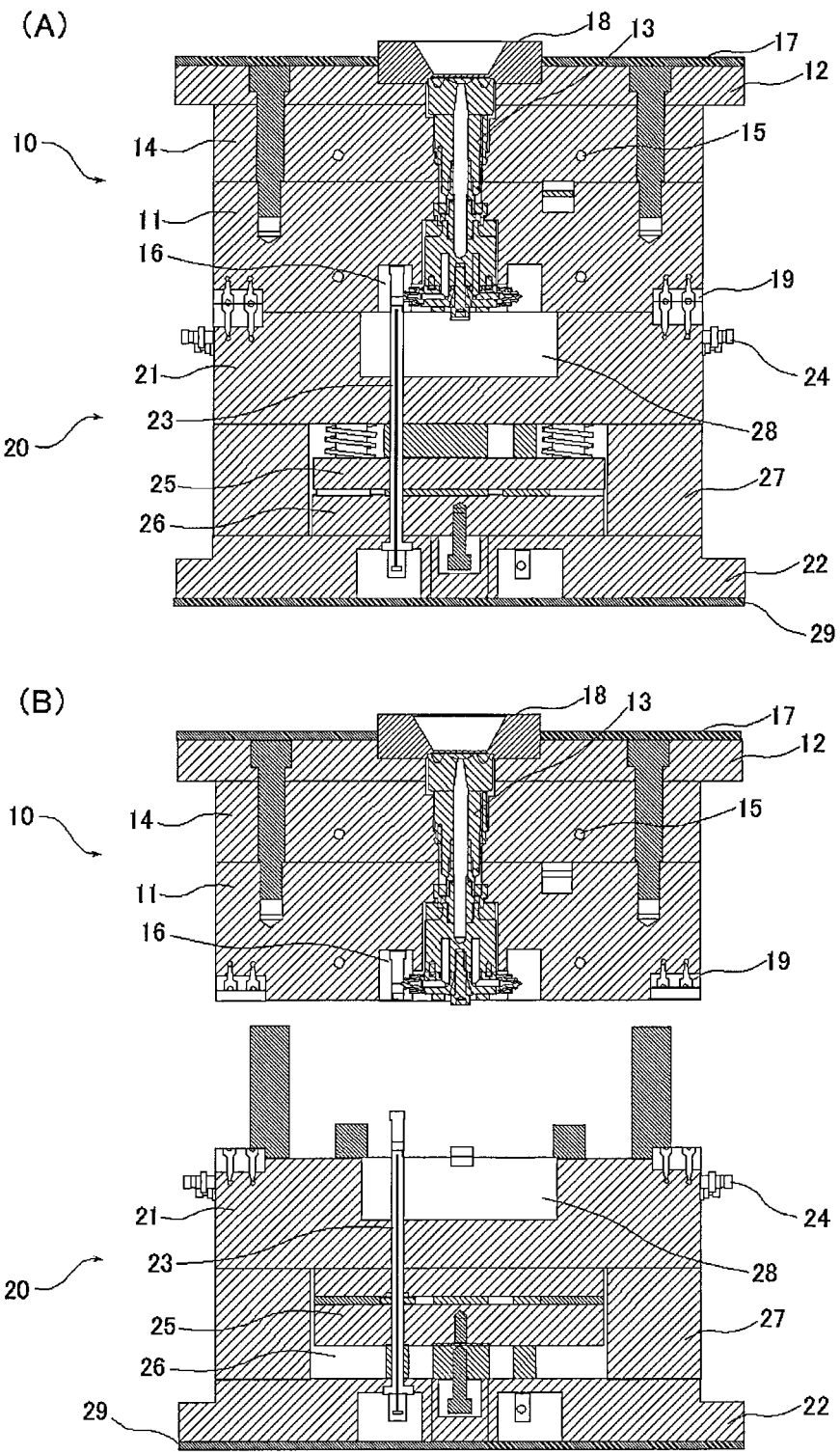
FIG. 1 is a longitudinal sectional view of a fine pattern transfer mold according to the present disclosure.

FIG. 1 is a longitudinal sectional view of an exemplified embodiment of a fine pattern transfer mold according to the present disclosure: FIG. 1(A) is a longitudinal sectional view of the mold in a closed state; and FIG. 1(B) is a longitudinal sectional view of the mold in an open state. The fine pattern transfer mold includes a fixed body 10 and a movable body 20 separable from each other. In the following description, the state of the mold in which the fixed body 10 and the movable body 20 are separated will be called the mold open state, and the state of the mold in which the fixed body 10 and the movable body 20 are coupled to each other will be called the mold closed state. The fine pattern transfer mold according to the present disclosure has a cubic shape or a rectangular solid shape as a whole in the mold closed state.

The fixed body 10 has a fixed-side mold plate 11 as the main part of the fixed body 10 and a fixed-side attachment plate 12 for attaching the fixed-side mold plate 11 to a fixed platen of a molding machine (not illustrated) with a fixed-side thermal insulation plate 17 therebetween. In the present embodiment, there is a stripper plate 14 interposed between the fixed-side mold plate 11 and the fixed-side attachment plate 12. The stripper plate 14 is used to automatically separate a sprue and a runner (described later) from the molded product when opening the mold.

The fixed-side thermal insulation plate 17 has at its center a locating ring 18 as a positioning part for attaching the fine pattern transfer mold to the molding machine. The locating ring 18 is formed in a ring shape and is fitted into a communication hole provided in the fixed-side thermal insulation plate 17 and the fixed-side attachment plate 12 in a thickness direction. A central opening of the locating ring 18 in the ring shape is connected to a hot runner member 13 that is located below the central opening so as to penetrate the fixed-side attachment plate 12, the stripper plate 14, and the fixed-side mold plate 11. The stripper plate 14 and the fixed-side mold plate 11 each have two fixed-side cooling water pipes 15 provided with the hot runner member 13 therebetween so as to penetrate parallel to each other in a direction orthogonal to the hot runner member 13.

An end of the hot runner member 13 facing away from the locating ring 18 is connected to a fixed-side bushing 16 having a predetermined space. The fixed-side bushing 16 is open at a coupling surface side facing the movable body 20 to be coupled, with a cavity member (described later) fitted into the predetermined space.

Taper blocks 19 are disposed near an edge of the coupling surface for high-accuracy positioning during coupling with the movable body 20.

The movable body 20 includes a movable-side mold plate 21 and a movable-side attachment plate 22. The movable-side mold plate 21 is the main part of the movable body 20 and faces the fixed-side mold plate 11 during the above-mentioned coupling. The movable-side attachment plate 22 is provided for attaching the movable-side mold plate 21 to a movable platen of the molding machine (not illustrated) with a movable-side thermal insulation plate 29 therebetween. An upper ejector plate 25 and a lower ejector plate 26 are interposed between the movable-side mold plate 21 and the movable-side attachment plate 22. The upper ejector plate 25 and the lower ejector plate 26 are used to eject the molded product by a biasing force and thereby remove the molded product. A spacer block 27 is interposed between the movable-side mold plate 21 and the movable-side attachment plate 22 to provide an operating space for ejection by the upper ejector plate 25 and the lower ejector plate 26.

The movable body 20 includes a core pin member 23 extending vertically so as to penetrate from the movable-side mold plate 21 through the operating space for the upper ejector plate 25 and the lower ejector plate 26 to a movable-side bushing 28 fitted with its open side facing the opening of the fixed-side bushing 16. The core pin member 23 has its leading end protruding beyond a coupling surface of the movable body 20 facing the fixed body 10. At this protruding position, the core pin member 23 is fitted into the cavity member.

The movable-side mold plate 21 has a movable-side cooling water joint 24 that allows cooling water to flow from outside into a movable-side cooling water pipe penetrating in a direction orthogonal to the direction in which the core pin member 23 extends. The movable-side cooling water joint 24 is connected to a cooling water pipe similar to the fixed-side cooling water pipes 15, while the fixed-side cooling water pipes 15 are connected to a cooling water joint similar to the movable-side cooling water joint 24.

Figure 2:
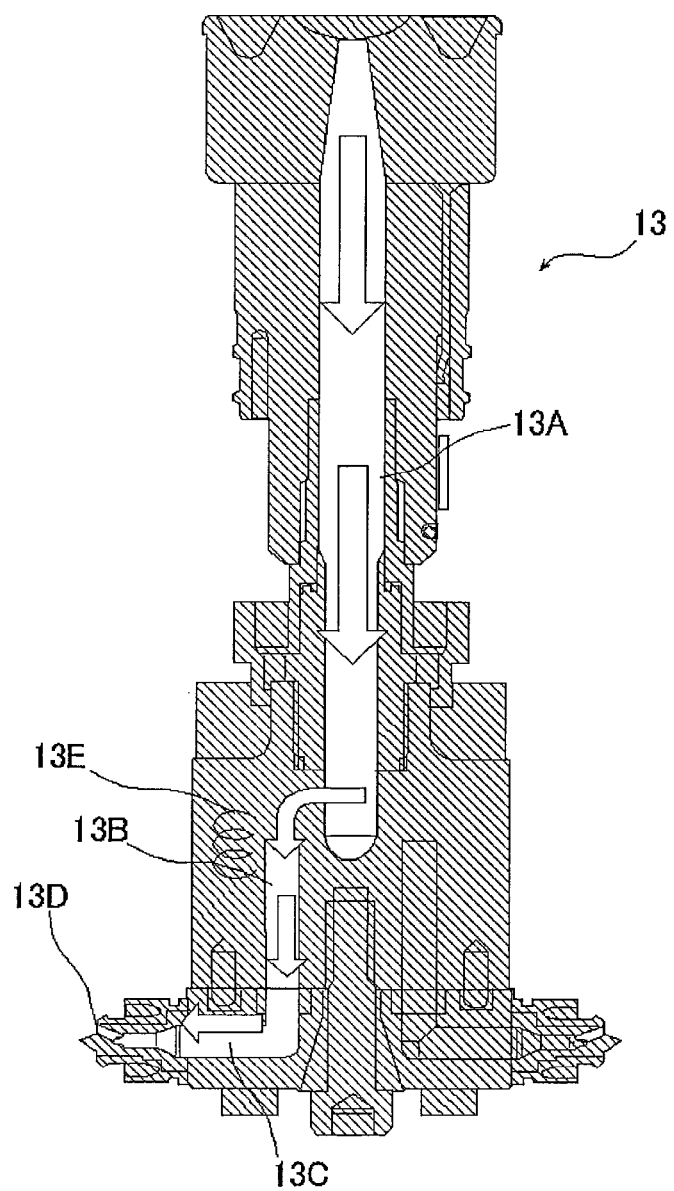
FIG. 2 is a longitudinal sectional view of a hot runner member.

FIG. 2 is a longitudinal sectional view of the hot runner member 13. A molten resin material is supplied to a sprue 13A from the molding machine (not illustrated). The resin material flows in the direction of the hollow arrows illustrated in FIG. 2 and enters a runner 13B. The number of the runners is one in the present embodiment, but the sprue 13A may branch into a plurality of runners, for example. The runner 13B is surrounded by a heater 13E along the flow of the resin material. The heater 13E prevents solidification of the resin material flowing in the runner 13B due to a temperature drop and maintains the resin material in a predetermined molten state. An injection part 13C is connected to a leading end of the runner 13B. The injection part 13C has an injection nozzle 13D through which the resin material is injected into a product molding area. Although the resin material may be any thermoplastic resin, cyclic olefin polymer, or the like is preferable.

A three-dimensional product requires a flow path of a resin material to be longer and to have a complex shape as compared to a flat product, and thus may be poorly molded due to a drop in the temperature of the resin material during a molding process. Therefore, the hot runner member 13 is employed to prevent a drop in the temperature of the resin material using the heater 13E until the resin material reaches the injection nozzle 13D.

Figure 3:
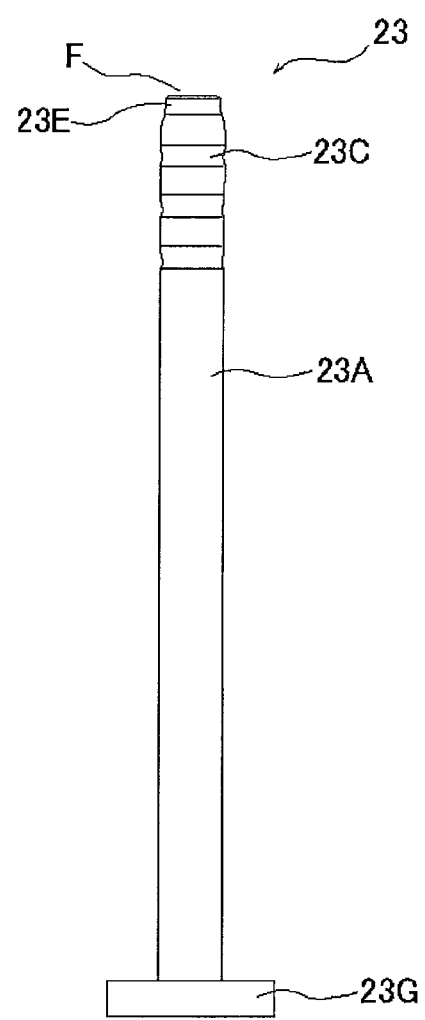
FIG. 3 is a side view of a core pin member.

FIG. 3 is a side view of the core pin member 23. The core pin member 23 extends vertically from the movable-side attachment plate 22 as described above with reference to FIG. 1. The core pin member 23 includes a base 23G at its lower end. An upper portion of the core pin member 23 has a plurality of grooves 23C with an ejector sleeve 23A between the grooves 23C and the base 23G, to ensure desired releasability after molding of the product. The upper portion of the core pin member 23 may not be formed with the grooves 23C as long as it ensures desired releasability. For example, the surface of the upper portion of the core pin member 23 may be roughened. A leading end 23E of the core pin member 23 has a fine pattern original plate F fixedly mounted on its upper surface. This fixing method can be welding, for example.

Figure 4:
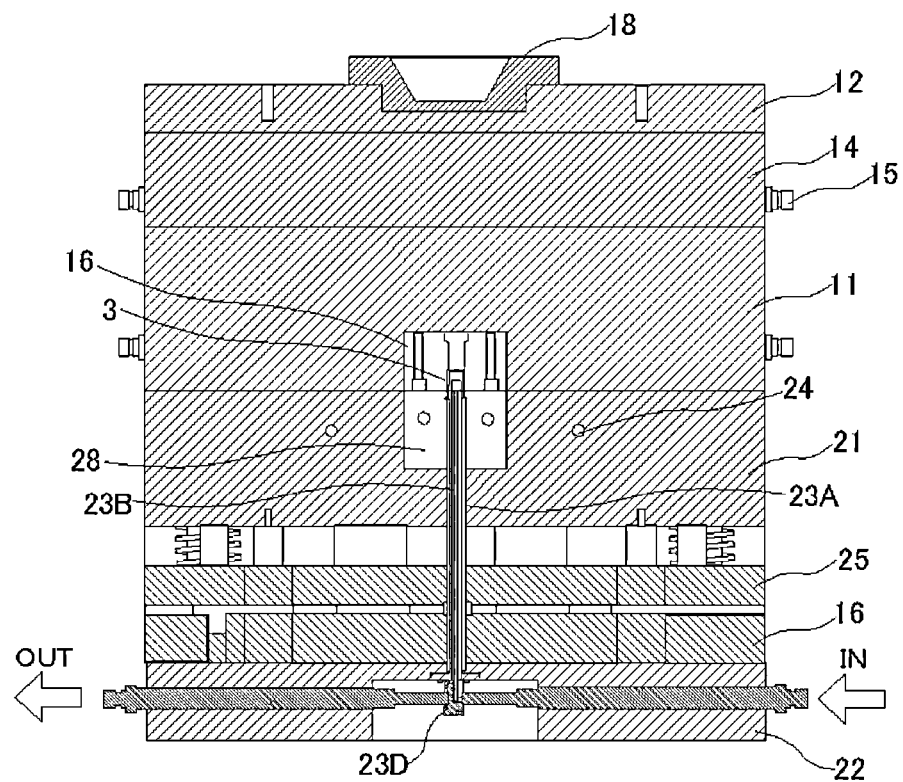
FIG. 4 is a longitudinal sectional view of the fine pattern transfer mold in the closed state showing the cross section of a temperature control flow path of the core pin member.
Figure 4:
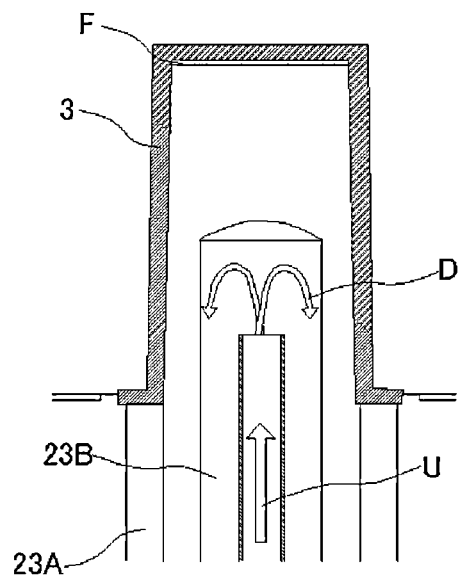
Figure 4:
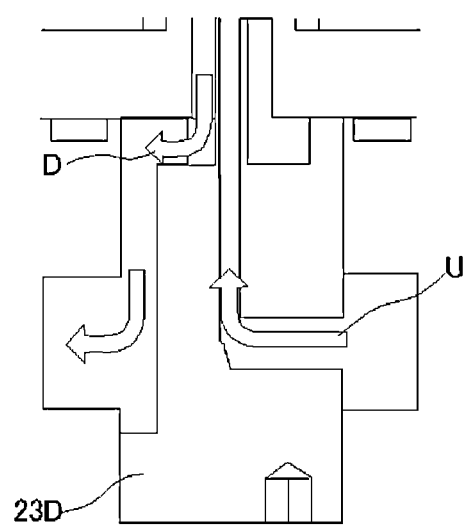

FIG. 4(A) is a longitudinal sectional view of the fine pattern transfer mold in the mold closed state showing the cross section of the temperature control flow path of the core pin member 23. The core pin member 23 has the ejector sleeve 23A on its outer side surface and has a temperature control member 23B inside. The ejector sleeve 23A is used to push upward a flange of the product molded around the leading end (core part) of the core pin member 23 and release the product from the core pin member 23.

FIG. 4(B) is an enlarged partial longitudinal sectional view of the leading end of the core pin member 23 having the temperature control member 23B inside, while FIG. 4(C) is an enlarged partial longitudinal sectional view of the lower end of the core pin member 23. The core pin member 23 has at its lower end a supply and discharge port 23D for supplying and discharging water to and from the temperature control member 23B. The temperature control member 23B has an internal space in which a hot water supply pipe is provided in a longitudinal center thereof and part of the internal space outside the supply pipe is a water drainage passage. Hot water taken in from outside (IN side in the drawing) as illustrated by a hollow arrow in FIG. 4(A) rises from the supply and discharge port 23D through the water supply pipe in the direction of the hollow arrow U, that is, in the direction toward the leading end of the temperature control member 23B as illustrated in FIG. 4(C). The hot water having risen and spouted from the upper opening in the temperature control member 23B maintains the leading end of the core pin member 23 at a predetermined temperature. The spouted hot water descends in the direction of the hollow arrows D along the water drainage passage of the temperature control member 23B. The hot water having descended is discharged from the supply and discharge port 23D in the direction of the hollow arrow D as illustrated in FIG. 4(C), and then is drained to the outside (OUT side in the drawing).

In a general mold (metal mold), the core part stores heat under the influence of temperature of a resin material or the like during product molding. The resin does not solidify around the core part storing heat, making a molding failure likely to occur. Therefore, in general, the core part is cooled by cooling water to clear the heat-storing state and shorten the molding cycle. The leading end of the core pin member 23 of the present disclosure is used for the purpose of transferring a fine pattern to the inner surface of a hollow product. When cooled like the general mold, transferability deteriorates, resulting in defective transfer at the corners of the concavities of the fine pattern, for example. In contrast, if the temperature of the leading end of the core pin member 23 is raised excessively, the molding cycle becomes longer as in the case of the general mold, which reduces productivity and causes molding defects. Therefore, in order to enable desired molding with the fine pattern, the temperature control member 23B is provided inside the core pin member 23 to maintain the leading end of the core pin member 23 at a predetermined temperature. The temperature adjustment member 23B maintains the leading end of the core pin member 23 at a predetermined temperature of preferably 90° C. or more and 100° C. or less, for example.

Figure 5:
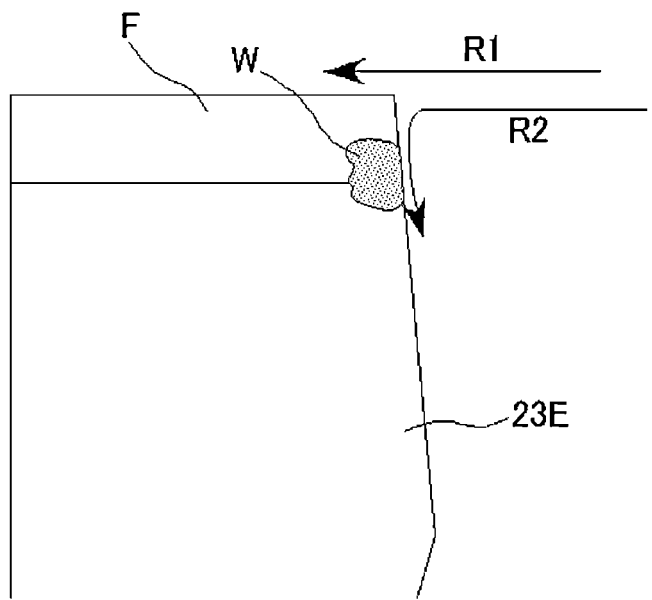
FIG. 5 is an enlarged partial view of the leading end of the core pin member.
Figure 5:
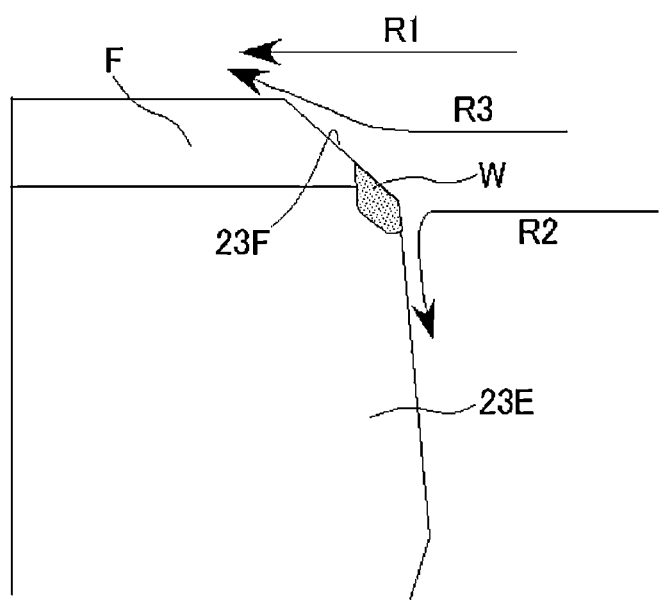

FIG. 5 is an enlarged partial view of the leading end 23E of the core pin member 23. The outer side surface of the leading end 23E of the core pin member 23 with the fine pattern plate F fixedly mounted on its upper surface is constituted by the outer side surfaces of two portions, that is, the outer side surface of the fine pattern original plate F and the outer side surface of the leading end 23E. The fine pattern original plate F is fixedly mounted on the leading end 23E with a joint W formed by a joining method such as welding, for example.

As illustrated in FIG. 5(A), some of the resin material injected from the injection nozzle 13D described above with reference to FIG. 2 via a gate (described later) travels directly in a horizontal direction of the upper surface of the fine pattern original plate F as shown by the arrow R1, and some other resin material contacts the outer side surface of the two portions and then travels downward as shown by the arrow R2.

To perform desired transfer of the fine pattern F, it is necessary that a constant amount of resin material reach the entire transfer surface of the fine pattern F as quickly as possible from the start of injection of the resin material. Therefore, the injected resin material flowing as shown by the arrow R2 is preferably guided in the horizontal direction of the transfer surface of the fine pattern F.

Thus, as illustrated in FIG. 5(B), the outer side surface of the two portions is cut so as to be tapered toward the transfer surface of the fine pattern original plate F in the horizontal direction, to thereby form a chamfered part 23F. Some of the resin material flows in the direction of arrow R1 shown in the drawing, and with the chamfered part 23F, some of the resin material comes to contact the oblique surface of the chamfered part 23F and is guided by the oblique surface in the direction of arrow R3. Therefore, as compared to the case illustrated in FIG. 5(A), a large amount of the resin material flows toward the transfer surface of the fine pattern F, allowing a uniform amount of resin material to reach the entire transfer surface more quickly.

Figure 6:
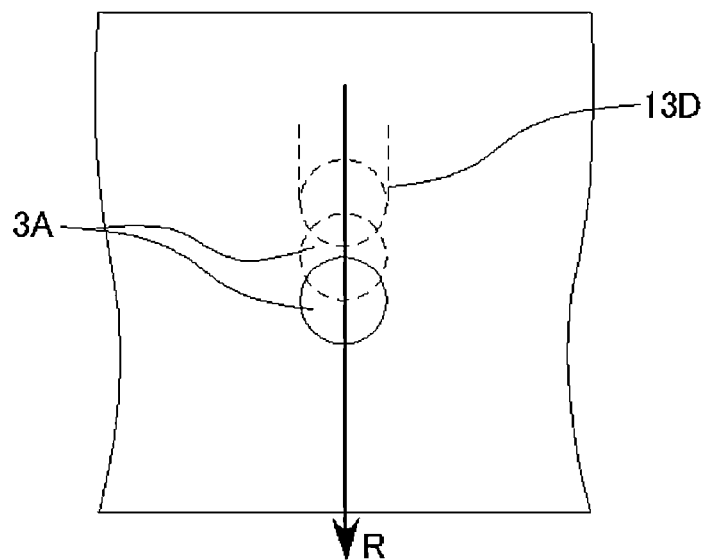
FIG. 6 is a schematic view of an injection nozzle and a gate formed at a predetermined angle.
Figure 6:
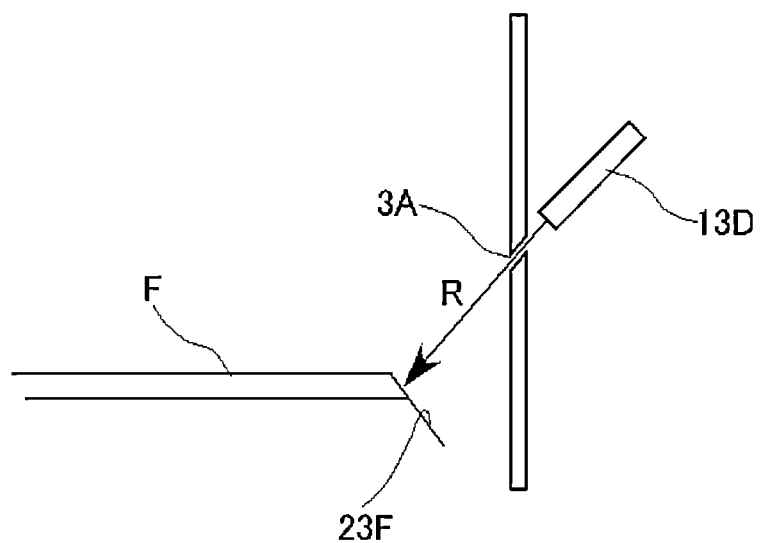

FIG. 6 is a schematic view of the injection nozzle 13D and a gate 3A formed at a predetermined angle: FIG. 6(A) is a schematic view of the injection nozzle 13D and the gate 3A as seen in a direction opposite to the direction in which an opening of the gate 3A faces; and FIG. 6(B) is a schematic longitudinal sectional view of the injection nozzle 13D and the gate 3A. In the present embodiment, the gate 3A has an opening that is located outside an end of the transfer surface of the fine pattern original plate F in a horizontal direction of the transfer surface and above the transfer surface and which faces the end of the transfer surface, and the injection nozzle 13D and the gate 3A are inclined at a predetermined angle such that a resin material R injected in a straight line from the injection nozzle 13D and the gate 3A contacts the chamfered part 23F.

This inclination allows the resin material R to be supplied to the transfer surface more efficiently and quickly. Further, since the opening of the gate 3A communicates between the injection nozzle 13D and the product formation chamber 3 obliquely to the thickness direction of the product formation chamber 3, it is possible to reduce shear stress applied during mold release as compared to the case of having no inclination angle, allowing the molded article to be smoothly removed.

Figure 7:
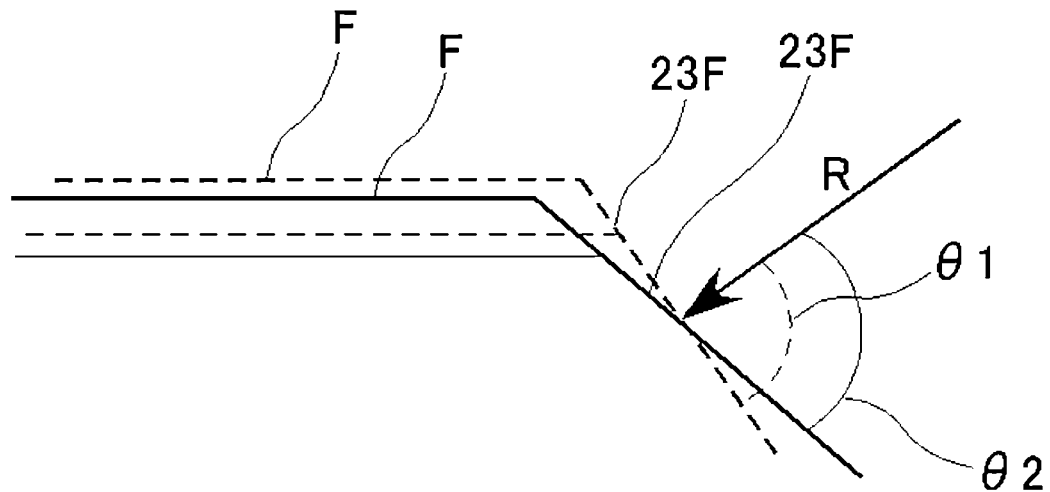
FIG. 7 is a schematic diagram illustrating the relationship between inclination angle of the chamfered part and injection angle.

FIG. 7 is a schematic diagram illustrating the relationship between inclination angle of the chamfered part and injection angle. The chamfered part 23F described above with reference to FIG. 6 is inclined relative to the horizontal direction of the transfer surface of the fine pattern original plate F, and has an inclination angle with respect to an injecting direction of the resin material R to the chamfered part 23F, the inclination angle being smaller than a right angle with respect to the injection direction. That is, as illustrated in FIG. 6, with the gate 3A inclined at a predetermined angle to allow the resin material R to contact the chamfered part 23F, if the chamfered part 23F is orthogonal to the injecting direction of the resin material R ($\theta 1$), the resin material R cannot be effectively guided to the transfer surface. Thus, relative to the horizontal direction of the transfer surface of the fine pattern original plate F, the chamfered part 23F is inclined at an angle ($\theta 2$) that allows the chamfered part 23F to have a smaller angle of inclination with respect to the injecting direction of the resin material R. This is because the obtuse inclined angle allows the resin material R to flow easily toward the transfer surface. When the injection angle of the gate 3A is set to 30 degrees and the angle of the cut surface of the chamfered part 23F is set to 60 degrees, for example, the resin material R will contact the chamfered part 23F in a substantially orthogonal direction. Thus, setting the angle of the cut surface of the chamfered part 23F to around 15 degrees allows the chamfered part 23F to serve effectively as a guide to the transfer surface. When the gate 3A is inclined at an angle greater than 40 degrees, the angle of the cut surface needs to be around five degrees to avoid the orthogonality. This case is equivalent to the case of forming no cut surface, which produces no effect of the guide. Therefore, it is considered preferable to set the angle of the gate 3A to 30 degrees and set the angle of the cut surface of the chamfered part 23F to around 15 degrees.

Figure 8:
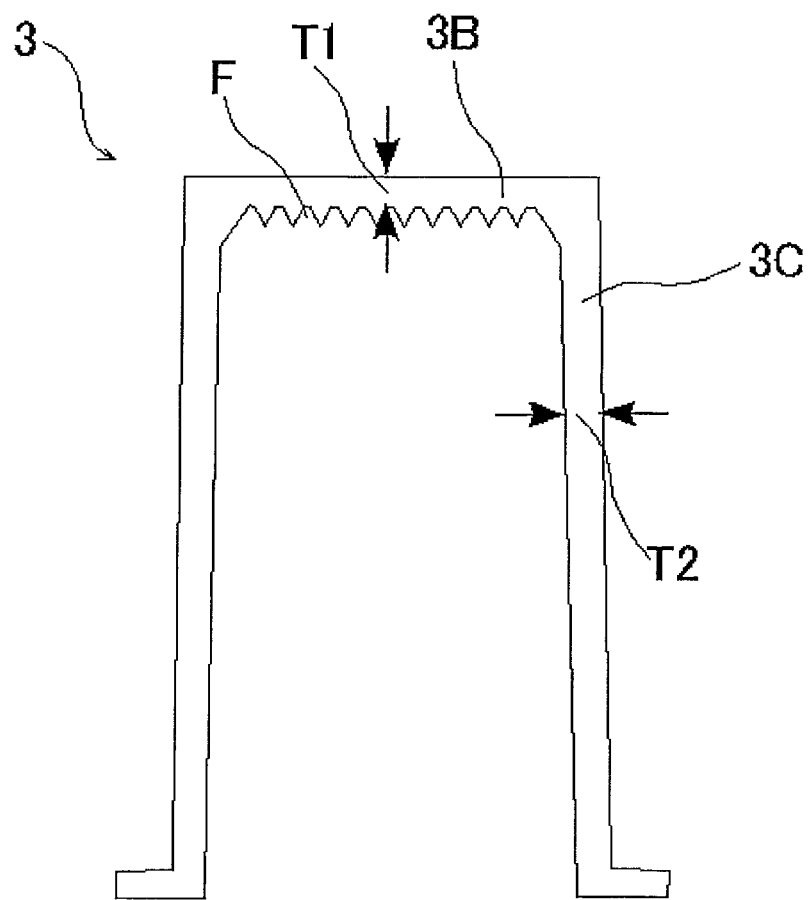
FIG. 8 is a schematic cross-sectional view of a product formation chamber with its thickness different at a portion having a transfer target surface and a portion other than that portion.

FIG. 8 is a schematic cross-sectional view of the product formation chamber 3 with difference in thickness at a portion having the transfer target surface and a portion other than that portion. Specifically, in the product formation chamber 3, a thickness T1 of a portion having a transfer target surface 3B is larger than a thickness T2 of a portion having a side surface 3C (i.e., a portion of the product formation chamber 3 other than the portion having the transfer target surface). Having such a difference in thickness allows a large amount of the resin material R injected into the product formation chamber 3 to be guided to the thicker part, thereby achieving a quick supply of the resin material R to the transfer target surface.

Figure 9:
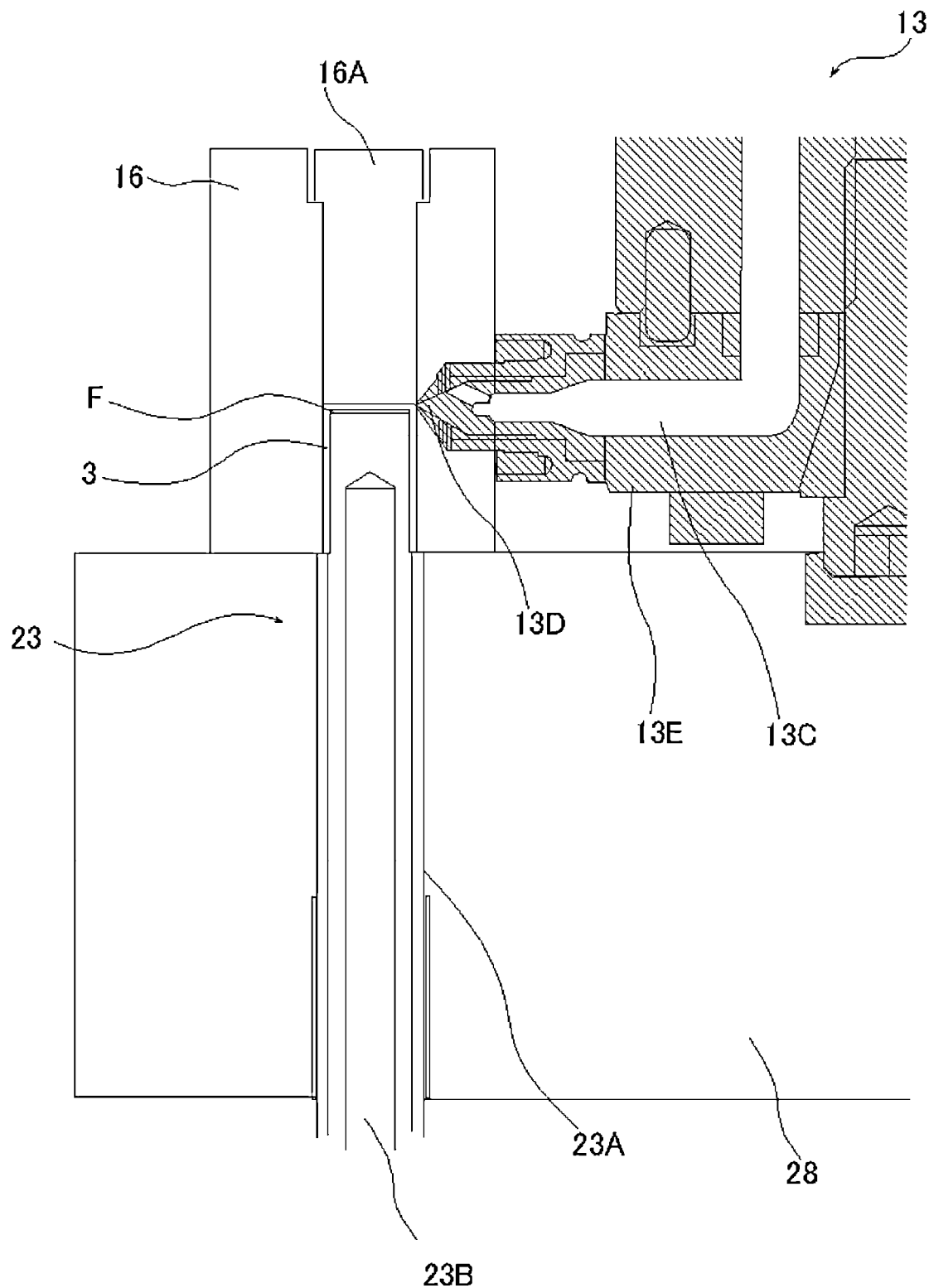
FIG. 9 is an enlarged partial longitudinal sectional view illustrating injection of a resin material into the product formation chamber with the mold closed.
Figure 10:
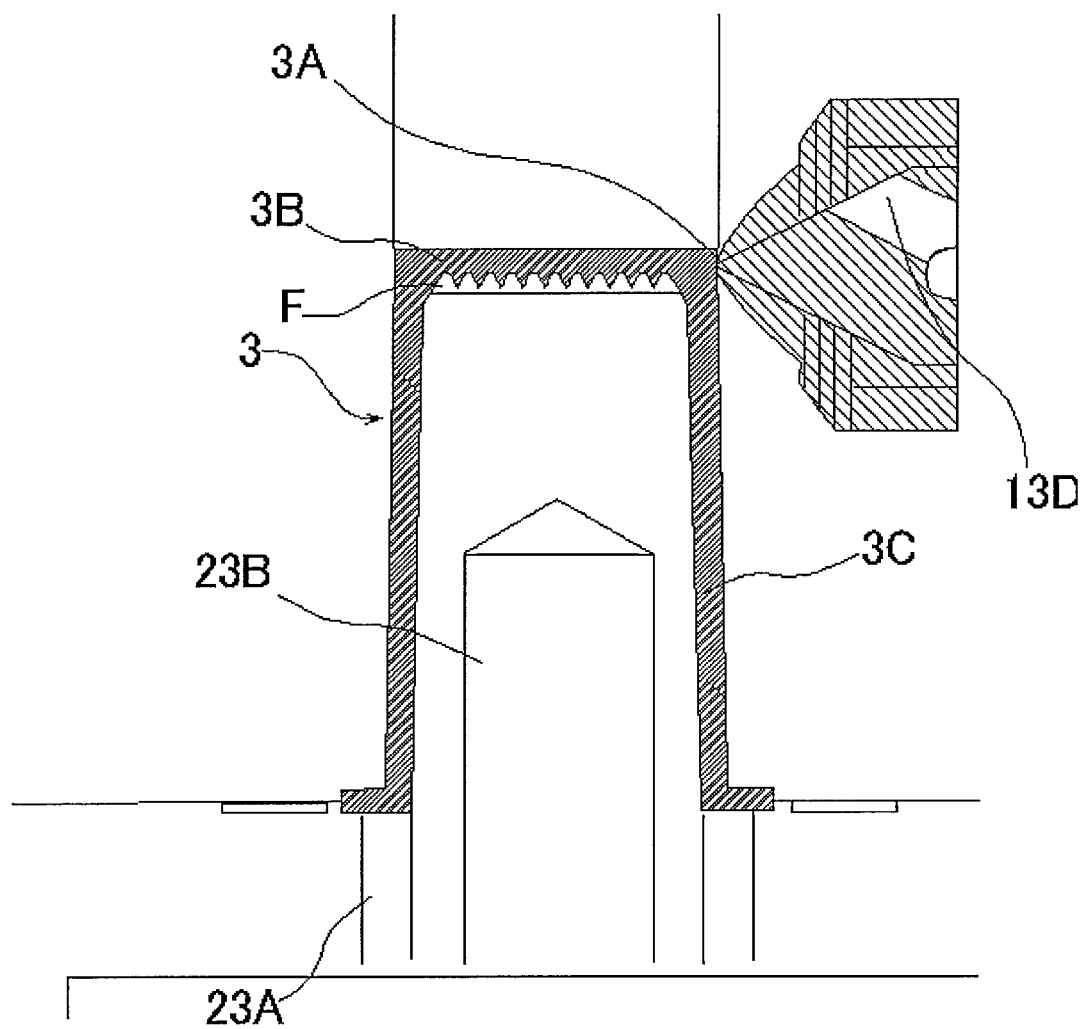
FIG. 10 is an enlarged partial longitudinal sectional view illustrating transfer of a fine pattern.

FIG. 9 is an enlarged partial longitudinal sectional view illustrating injection of a resin material into the product formation chamber in the mold closed state. FIG. 10 is an enlarged partial longitudinal sectional view illustrating transfer of a fine pattern.

As described above with reference to FIGS. 1 to 4, in the mold closed state, the core pin member 23 and the cavity member 16A fitted into the fixed-side bushing 16 mate with each other to form the product formation chamber 3. As illustrated in FIG. 9, in the product formation chamber 3, the opening of the gate 3A is located outside an end of the transfer surface of the fine pattern original plate F in the horizontal direction of the transfer surface and faces the end of the transfer surface. The gate 3A is directly coupled to the injection nozzle 13D of the hot runner member 13 so that the resin material is supplied to the side surface 3C as well as the transfer target surface 3B of the product formation chamber 3.

Figure 11:
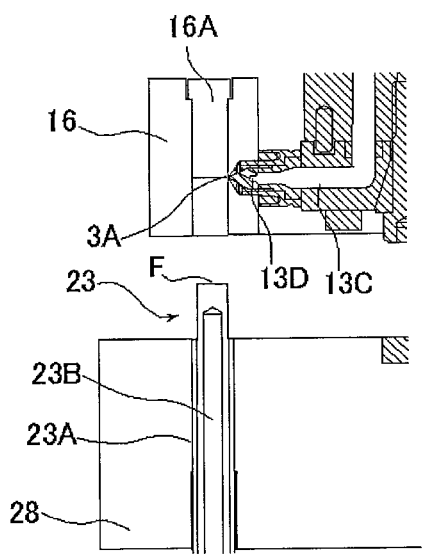
FIG. 11 is a diagram illustrating a process for transferring a fine pattern using the fine pattern transfer mold according to the present disclosure.
Figure 11:
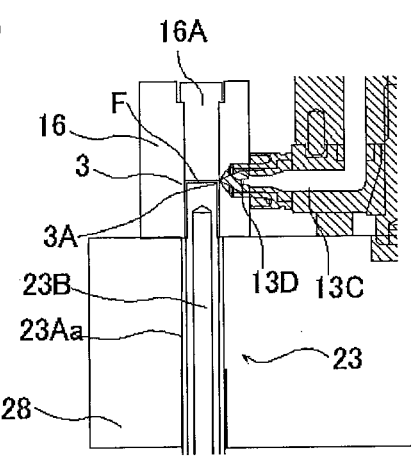
Figure 11:
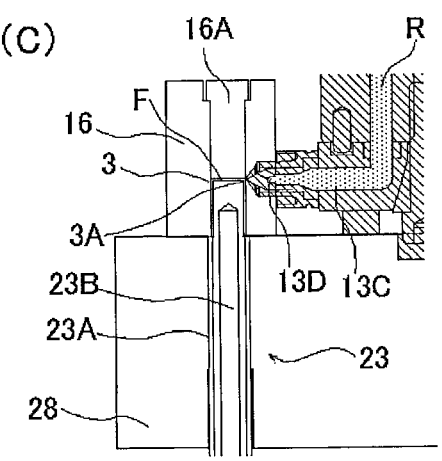
Figure 11:
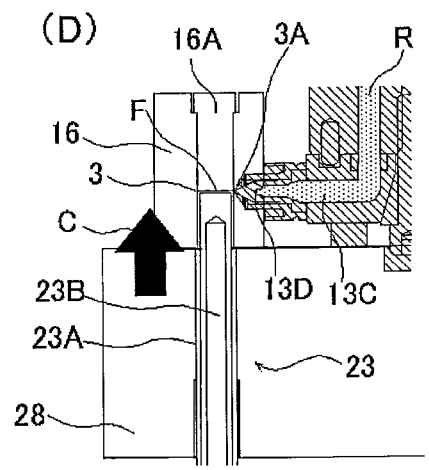
Figure 11:
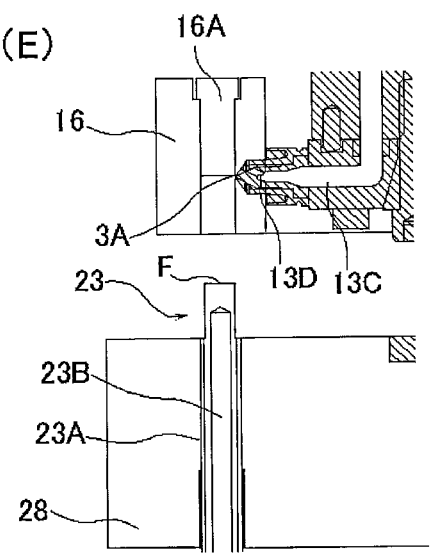
Figure 11:
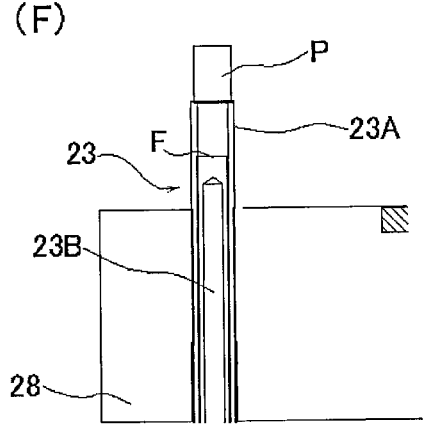

FIG. 11 is a diagram illustrating a process for transferring a fine pattern using the fine pattern transfer mold according to the present disclosure: FIG. 11(A) is a diagram illustrating the mold open state before supply of the resin material. In this state, the molding machine (not illustrated) is powered on, and molding conditions including a temperature setting of the temperature control member 23B are inputted. Then, the molding cycle is started, and the movable body 20 is moved to the fixed body 10 to bring the fine pattern transfer mold into the mold closed state as illustrated in FIG. 11(B). At this time, the concave cavity member 16A and the convex core pin member 23 to which the fine pattern original plate F is fixedly mounted on the leading end mate with each other to form the product formation chamber 3 therebetween.

As illustrated in FIG. 11(C), the molten resin material R is injected into the product formation chamber 3 from the injection nozzle 13D of the injection part 13C of the hot runner member 13 through the gate 3A. At this time, hot water is supplied to the temperature control member 23B of the core pin member 23 to maintain the leading end 23E of the core pin member 23, to which the fine pattern original plate F is fixed, at a predetermined temperature. This prevents the molten resin material R from solidifying due to a temperature drop. The temperature control with the temperature control member 23B continues until the supply of the resin material R into the product formation chamber 3 by the injection is completed.

FIG. 11(D) is a diagram illustrating the resin material R being compressed by further mold closing (pressure is further applied in the direction of the arrow in the drawing). When transitioning from the state illustrated in FIG. 11(C) to the state illustrated in FIG. 11(D), the resin material is gradually supplied to the side surface 3C side of the product formation chamber 3 along with emission of gas via a gap between the cavity member 16A and the core pin member 23 mating together.

The molten resin material R is injected in the horizontal direction of the transfer surface from the gate 3A having an opening that is located outside the end of the transfer surface in the horizontal direction of the transfer surface and which faces the end of the transfer surface, to supply the resin material R into the product formation chamber 3. Accordingly, the resin material is efficiently supplied onto the transfer surface.

After the step illustrated in FIG. 11(D), when the resin material is supplied to the entire product formation chamber 3, the injection of the resin material is ended and the cooling process is started. After a lapse of a predetermined time, as illustrated in FIG. 11(E), the movable body 20 is separated from the fixed body 10 to open the mold. Finally, the ejector sleeve 23A of the core pin member 23 is used to push the flange of the molded product having the fine pattern of the fine pattern original plate F transferred to the transfer target surface in the product formation chamber 3, whereby the integrally molded hollow product is obtained.

For the temperature control by the temperature control member 23B, when a fine pattern having at least concavities with a depth of 3 μm or more and 4 μm or less is to be transferred to the bottom surface of a bottomed hollow product with a wall thickness of 0.3 to 0.5 mm, for example, the predetermined temperature is preferably set to 90° C. or more and 100° C. or less for desired transfer.

EXAMPLES

Figure 12:
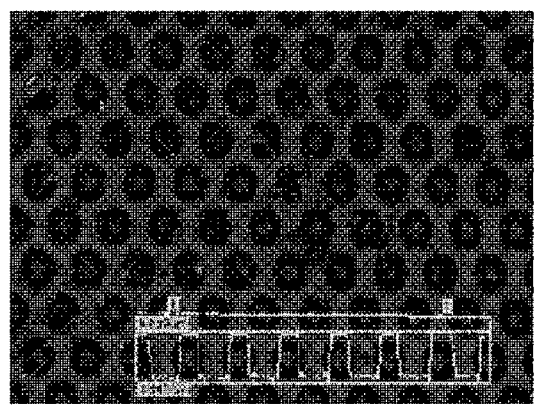
FIG. 12 is an enlarged photograph of a fine pattern formed surface.
Figure 12:
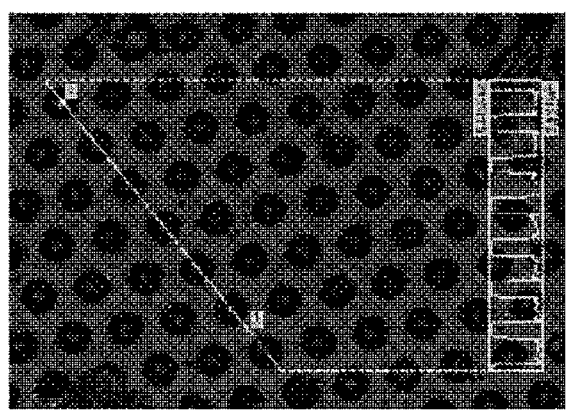

FIG. 12 is an enlarged photograph of a fine pattern formed surface in the case where a fine pattern is transferred to a bottom surface of a bottomed hollow product at different temperatures of mainly the temperature control member of the core pin member: FIG. 12(A) is a photograph of the fine pattern formed surface in the case where the core pin member is maintained at a temperature of 80° C.; and FIG. 12(B) is an enlarged photograph of the fine pattern formed surface in the case where the core pin member is maintained at a temperature of 90° C. In this example, the temperature of a hot manifold (hot runner member) is 300° C.

In the case (A), the concavities of the fine pattern are shallow (2.741 μm), and the flat surface part (part of the fine pattern except the concavities) is fairly dirt. In the case (B), as compared to the case (A), the opening of the concavities in the fine pattern has a substantially circular shape and the flat surface part is clearly formed; in addition, the concavities of the fine pattern have a depth of 3.244 μm.

Thus, preventing a temperature drop in the fine pattern original plate fixed to the leading end of the core pin member and maintaining the fine pattern original plate at the predetermined temperature using the temperature control member enable integral molding of the hollow product with desired pattern transfer to the interior thereof.

REFERENCE SIGNS LIST

10 . . . Fixed body
11 . . . Fixed-side mold plate
12 . . . Fixed-side attachment plate
13 . . . Hot runner member
13A . . . Sprue
13B . . . Runner
13C . . . Injection part
13D . . . Injection nozzle
13E . . . Heater
14 . . . Stripper plate
15 . . . Fixed-side cooling water pipe
16 . . . Fixed-side bushing
16A . . . Cavity member
17 . . . Fixed-side thermal insulation plate
18 . . . Locating ring
19 . . . Taper block
20 . . . Movable body
21 . . . Movable-side mold plate
22 . . . Movable-side attachment plate
23 . . . Core pin member
24 . . . Movable-side cooling water joint
25 . . . Upper ejector plate
26 . . . Lower ejector plate
27 . . . Spacer block
28 . . . Movable-side bushing
29 . . . Movable-side thermal insulation plate
3 . . . Product formation chamber
3A . . . Gate
3B . . . Transfer target surface
F . . . Fine pattern original plate

The invention claimed is:

1. A fine pattern transfer mold that transfers a fine pattern to an inner surface of a hollow product by injection molding, comprising:
   a mold body including a fixed body and a movable body separable from each other, the fixed body having a coupling surface coupled to the movable body, the movable body having a coupling surface facing the coupling surface of the fixed body;
   a cavity formed in a concave shape on the coupling surface of the fixed body;
   a core pin member projecting from the coupling surface of the movable body so as to face the cavity, the core pin member having a predetermined portion at which a fine pattern original plate for transfer of the fine pattern is mounted;
   a product formation chamber that is formed between the cavity and the core pin member with the fixed body and the movable body clamped together;
   a gate having an opening that is located in the product formation chamber and outside an end of a transfer surface of the fine pattern original plate in a horizontal direction of the transfer surface and which faces the end of the transfer surface; and a hot runner member that has formed a flow path for a predetermined resin material in the fixed body and includes an injection nozzle directly coupled to the gate, the hot runner member being configured to:
heat the flow path; and
guide the resin material to the injection nozzle while maintaining, through the heated flow path, the resin material in a molten state at a predetermined temperature, wherein the core pin member and the fine pattern original plate mounted at the end portion of the core pin member constitute a stacked structure;

the stacked structure has an outer side surface that comprises:
a first outer side surface with which the resin material injected toward the transfer surface comes into contract; and
a second outer side surface of the end portion, the first outer side surface being on the second outer side surface; and the outer side surface of the stacked structure has a chamfered surface tapered toward the transfer surface of the fine pattern original plate; and
the molten resin material is injected from the injection nozzle via the gate in a direction toward the transfer surface to integrally mold the hollow product in the product formation chamber.

2. The fine pattern transfer mold according to claim 1, wherein, when the hollow product has a bottom and an inner bottom surface thereof is a transfer target surface to which the fine pattern is to be transferred, the fine pattern original plate is fixedly mounted on a top surface of the core pin member.

3. The fine pattern transfer mold according to claim 2, wherein the core pin member comprises a temperature control member that prevents the predetermined portion, at which the fine pattern original plate is mounted, from having a temperature less than the predetermined temperature.

4. The fine pattern transfer mold according to claim 3, wherein the predetermined temperature is 90° C. or more and 100° C. or less.

5. The fine pattern transfer mold according to claim 2, wherein:

the opening of the gate is located higher than the transfer surface of the fine pattern original plate; and
the injection nozzle and the gate are inclined at a predetermined angle with respect to the tapered chamfered surface such that the resin material injected in a straight line from the injection nozzle and the gate comes into contact with the tapered chamfered surface.

6. The fine pattern transfer mold according to claim 5, wherein the tapered chamfered surface is inclined relative to the horizontal direction of the transfer surface, and has an inclination angle with respect to an injection direction of the resin material to the tapered chamfered surface, the inclination angle being smaller than a right angle with respect to the injection direction.

7. The fine pattern transfer mold according to claim wherein
the product formation chamber comprises:
a first portion having a transfer target surface to which the fine pattern is to be transferred; and
a second portion other than the first portion,
each of the first portion and second portion having a thickness,
the thickness of the first portion being larger than the thickness of the second portion.

8. The fine pattern transfer mold according to claim 1, wherein
the core pin member comprises a temperature control member that prevents the predetermined portion, at which the fine pattern original plate is mounted, from having a temperature less than the predetermined temperature.

9. The fine pattern transfer mold according to claim wherein
the product formation chamber comprises:
a first portion having a transfer target surface to which the fine pattern is to be transferred; and
a second portion other than the first portion,
each of the first portion and second portion having a thickness,
the thickness of the first portion being larger than the thickness of the second portion.

* * * * *